(12) United States Patent
Kremer et al.

(10) Patent No.: US 8,133,141 B2
(45) Date of Patent: Mar. 13, 2012

(54) HYDRAULIC SYSTEM

(75) Inventors: Eugen Kremer, Bühl (DE); Eric Müller, Kaiserslautern (DE); Jochen Pfister, Strasbourg (FR); Reinhard Stehr, Bühl (DE); Ronald Glas, Obersasbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 468 days.

(21) Appl. No.: 12/317,240

(22) Filed: Dec. 19, 2008

(65) Prior Publication Data

US 2009/0197717 A1   Aug. 6, 2009

Related U.S. Application Data

(60) Provisional application No. 61/062,882, filed on Dec. 19, 2007.

(51) Int. Cl.
*F16H 59/00* (2006.01)

(52) U.S. Cl. .............................. 474/28; 474/18; 474/69

(58) Field of Classification Search .............. 474/17–18, 474/28, 69–70
See application file for complete search history.

(56) References Cited

U.S. PATENT DOCUMENTS

| | | | | |
|---|---|---|---|---|
| 5,046,991 | A * | 9/1991 | Friedmann | 474/18 |
| 5,295,915 | A * | 3/1994 | Friedmann | 474/18 |
| 5,725,447 | A * | 3/1998 | Friedmann et al. | 474/18 |
| 6,068,565 | A * | 5/2000 | Riemer et al. | 474/18 |
| 6,336,880 | B1 * | 1/2002 | Agner | 474/28 |
| 6,712,724 | B2 * | 3/2004 | Katou | 474/28 |
| 2007/0249439 | A1 | 10/2007 | Gantner et al. | 474/17 |

FOREIGN PATENT DOCUMENTS

| | | |
|---|---|---|
| DE | 42 34 294 A1 | 4/1993 |
| WO | WO 2007/110026 A1 | 4/1993 |

* cited by examiner

*Primary Examiner* — Sang Kim
(74) *Attorney, Agent, or Firm* — Alfred J. Mangels (57) ABSTRACT

The invention relates to a hydraulic system for actuating a continuously variable belt-driven conical-pulley transmission having two conical pulleys encircled by an endless torque-transmitting means, each of which comprises two conical disks, one of which is axially movable depending on the pressure in an associated pressing chamber, and having a torque sensor which includes a torque sensing chamber that is connected to a hydraulic energy source and is linked with the pressing chambers.

The invention is distinguished by the fact that the pressing chambers are connected via a first hydraulic resistance element to the torque sensing chamber, and via a second hydraulic resistance element to an additional pressure chamber, in which a lower pressure prevails than in the pressing chambers and/or the torque sensing chamber.

27 Claims, 6 Drawing Sheets

Fig. 10

HYDRAULIC SYSTEM

BACKGROUND OF THE INVENTION

1. Field of the Invention

The invention relates to a hydraulic system for actuating a continuously variable belt-driven conical-pulley transmission having two conical pulleys encircled by an endless torque-transmitting means, each of which comprises two conical disks, one of which is axially movable depending on the pressure in an associated pressing chamber; and having a torque sensor which includes a torque sensing chamber that is connected to a hydraulic energy source and is linked with the pressing chambers.

2. Description of the Related Art

A belt-driven conical-pulley transmission with a torque sensor is known from German published unexamined application DE 42 34 294 A1 which is designed as a valve controlled by transmission ratio and torque, and which transmits the torque directly from the input-side pulley to the output-side pulley. A torque-sensing device for a belt-driven conical-pulley transmission is known from international publication WO 2007/110026 A1 which includes ramp surfaces with a gradient that decreases with increasing distance from its lowest point in such a way that the quotient of clamping pressure and torque is essentially independent of the positions of the ramp surfaces and the guide surface relative to each other.

The object of the invention is to create a hydraulic system according to the preamble of Claim 1, by which the torque-dependent and transmission-ratio-dependent axial clamping of the axially movable conical disks is optimized. At the same time, the clamping pressure in the pressing chambers should in particular not depend on the speed of rotation.

SUMMARY OF THE INVENTION

The problem is solved in the case of a hydraulic system for actuating a continuously variable belt-driven conical-pulley transmission having two conical pulleys encircled by an endless torque-transmitting means, each of which comprises two conical disks, one of which is axially movable depending on the pressure in an associated pressing chamber, and having a torque sensor which includes a torque sensing chamber that is connected to a hydraulic energy source and is linked with the pressing chambers, in that the pressing chambers are connected via a first hydraulic resistance element to the torque sensing chamber and via a second hydraulic resistance element to an additional pressure chamber, in which a lower pressure prevails than in the pressing chambers and/or the torque sensing chamber. The pressure drop produced with the aid of the resistance elements results in a flow volume between the torque sensing chamber and the additional pressure chamber. This flow volume is used, according to an essential aspect of the invention, to produce the transmission-ratio-dependent clamping pressure in the pressing chambers. The hydraulic energy source is preferably a pump.

One preferred exemplary embodiment of the hydraulic system is characterized in that at least one of the hydraulic resistance elements is of adjustable design and is controlled by the transmission ratio of the belt-driven conical-pulley transmission. According to an essential aspect of the invention, the clamping pressure in the pressure chambers is modulated in regard to the transmission ratio setting with the aid of the adjustable hydraulic resistance element, in particular an adjustable orifice. The total pressure drop between the torque sensing chamber and the additional pressure chamber is divided in a predetermined ratio with the aid of the movable hydraulic resistance element in such a way that the appropriate clamping pressure develops in the pressing chambers.

Another preferred exemplary embodiment of the hydraulic system is characterized in that the adjustable hydraulic resistance element is connected between the torque sensing chamber and a connection which joins the two pressing chambers with each other. A flow volume of hydraulic medium passes from the torque sensing chamber into the pressing chambers via the adjustable hydraulic resistance element. The flow volume of hydraulic medium is controlled by the adjustable hydraulic resistance element, depending on the transmission ratio of the belt-driven conical-pulley transmission.

Another preferred exemplary embodiment of the hydraulic system is characterized in that a pressure limiting valve is connected between the connection and the two hydraulic resistance elements. The pressure limiting valve serves to limit or reduce the pressure in the torque sensing chamber.

Another preferred exemplary embodiment of the hydraulic system is characterized in that the pressure limiting valve has pressure area translation and is connected to another hydraulic energy source. A pressure translation occurs through the other hydraulic energy source, preferably another pump, and the pressure area translation of the pressure limiting valve, in order to produce the requisite clamping pressure in the pressing chambers.

Another preferred exemplary embodiment of the hydraulic system is characterized in that the connection flows in between the two resistance elements. The flow volume of hydraulic medium from the torque sensing chamber branches off between the two resistance elements and is fed to the pressing chambers.

Another preferred exemplary embodiment of the hydraulic system is characterized in that a fixed hydraulic resistance element is connected between the output of the connection and the additional pressure chamber. The fixed hydraulic resistance element is executed for example as an orifice with a fixed orifice cross section.

Another preferred exemplary embodiment of the hydraulic system is characterized in that another adjustable hydraulic resistance element is connected between the output of the connection and the additional pressure chamber. Preferably, the other adjustable hydraulic resistance element is also controlled by the transmission ratio of the belt-driven conical-pulley transmission.

Another preferred exemplary embodiment of the hydraulic system is characterized in that a pressure reducing valve is connected between the additional pressure chamber and a pressure relief space. The pressure reducing valve is preferably provided with a pressure translation system, in order to produce a pressure in the additional pressure chamber that is proportional to the pressure in the torque sensing chamber.

Additional preferred exemplary embodiments of the hydraulic system are characterized in that the pressure in the torque sensing chamber corresponds to a maximum setpoint of the pressure in the pressing chambers, and the pressure in the additional pressure chamber corresponds to a minimum setpoint of the pressure in the pressing chambers. The result is that the clamping pressure is less sensitive to tolerances of the resistance elements.

Another preferred exemplary embodiment of the hydraulic system is characterized in that the adjustable hydraulic resistance element or elements include at least one control edge of a directional valve. The directional valve is executed for example as a 5/2 directional valve, and can be connected between the second hydraulic resistance element and a pressure relief space. The directional valve is preferably actuated by the pressure before and after the two resistance elements.

Other preferred exemplary embodiments of the hydraulic system are characterized in that the directional valve is actuated via a control pressure line by a proportional valve, which for its part is preferably actuated depending on the transmission ratio. The actuation of the proportional valve is preferably accomplished by a transmission-ratio-dependent electric control signal.

Another preferred exemplary embodiment of the hydraulic system is characterized in that the directional valve is actuated depending on the transmission ratio by means of a mechanical translation system. The actuation is accomplished for example via a lever device directly by the axial travel of one of the axially movable conical disks.

Another preferred exemplary embodiment of the hydraulic system is characterized in that one of the hydraulic resistance elements is connected between the torque sensing chamber and the additional pressure chamber. The additional pressure chamber is for example a tank with hydraulic medium.

Another preferred exemplary embodiment of the hydraulic system is characterized in that one of the hydraulic resistance elements is connected between the torque sensing chamber and the other torque sensing chamber or the pressing chamber. The two torque sensing chambers are connected with each other through the hydraulic resistance element. Preferably, the other torque sensing chamber is directly connected with the pressing chambers, whereas the first-named torque sensing chamber is connected with the pressing chambers and the other torque sensing chamber through one of the resistance elements.

Another preferred exemplary embodiment of the hydraulic system is characterized in that one of the hydraulic resistance elements includes a fixed orifice, which is integrated into one of the axially fixed conical disks. The fixed orifice is preferably executed as a hole bored in the axially fixed conical disk.

Another preferred exemplary embodiment of the hydraulic system is characterized in that one of the hydraulic resistance elements includes a variable orifice, which is integrated into one of the axially fixed conical disks. The variable orifice preferably includes a hole bored in the axially fixed conical disk.

Another preferred exemplary embodiment of the hydraulic system is characterized in that the variable orifice includes a chamfer which is provided in one of the axially fixed conical disks and whose longitudinal section has a gradient such that the cross section of the orifice varies depending on the axial displacement of the associated conical disk. Because of the special shaping of the chamfer, it is possible to set the desired orifice cross section depending on the movable disk.

Another preferred exemplary embodiment of the hydraulic system is characterized in that one of the hydraulic resistance elements includes a variable orifice with a piston that is movable back and forth in the radial direction. The piston is received, preferably with the help of a sleeve, so that it is movable back and forth in a bore—preferably radial—in the axially fixed conical disk.

Another preferred exemplary embodiment of the hydraulic system is characterized in that one end of the piston has a chamfer that acts in combination with a chamfer on the corresponding axially movable conical disk. The movable disk motion of the corresponding axially movable conical disk is translated by the interaction of the two chamfers into a radial motion of the piston.

Another preferred exemplary embodiment of the hydraulic system is characterized in that the piston includes a control chamfer which has a slope such that the cross section of the orifice varies depending on the axial displacement of the associated conical disk. Because of the special shaping of the chamfer, it is possible to set the desired orifice cross section depending on the movable disk.

Another preferred exemplary embodiment of the hydraulic system is characterized in that the hydraulic resistance elements are executed as throttles, orifices or control edges. Both hydraulic resistance elements may be executed as throttles, orifices or control edges. It is also possible, however, for one resistance element to be executed as a throttle and the other as an orifice or a control edge.

Another preferred exemplary embodiment of the hydraulic system is characterized in that the additional pressure chamber is connected to a pressure relief space. The pressure relief space may be for example a hydraulic medium tank or an oil sump of a motor vehicle.

Another preferred exemplary embodiment of the hydraulic system is characterized in that the torque sensor includes a ramp mechanism and, after the principle of a pressure limiting valve, produces a pressure in the torque sensing chamber that is proportional to the torque. Preferably, the torque sensor includes rolling elements such as balls distributed around its circumference, which act together with rolling surfaces or supporting surfaces or ramps to produce torque-dependent and/or transmission-ratio-dependent bracing forces or pressing forces.

Another preferred exemplary embodiment of the hydraulic system is characterized in that the ramp mechanism includes ramps with a transmission-ratio-independent constant gradient in order to produce a pressure proportional to the torque. A ramp mechanism of this sort is revealed for example in German published unexamined application DE 42 34 294 A1, in particular in FIG. 1 and the associated description of the figures.

BRIEF DESCRIPTION OF THE DRAWINGS

Additional advantages, features and details of the invention derive from the following description, in which various exemplary embodiments are described in detail with reference to the drawing. The figures show the following.

DESCRIPTION OF THE PREFERRED EMBODIMENTS

FIGS. 1 through 6 each depict a continuously variable belt-driven conical-pulley transmission according to various exemplary embodiments of the invention. Such belt-driven conical-pulley transmissions are also referred to as CVT transmissions (continuously variable transmissions) and include two conical pulleys 1, 2, each of which includes one axially fixed conical disk 3, 5 and one axially movable conical disk 4, 6. The two conical pulleys 1, 2 are coupled with each other by an endless torque-transmitting means 8, in particular a chain. A torque sensor 10 is integrated into the belt-driven conical-pulley transmission. A belt-driven conical-pulley transmission of this sort is known for example from German published unexamined application DE 42 34 294 A1.

The present invention relates to a hydraulic system for torque-dependent and transmission-ratio-dependent axial clamping of the axially movable conical disks 4, 6. Conical pulley 1 is connected to an input shaft 11 of the transmission with a rotationally fixed connection. Conical pulley 2 is connected to an output shaft 12 of the transmission with a rotationally fixed connection. Torque sensor 10 includes a torque sensing chamber 14, which can be relieved via a control edge into a tank 15 for hydraulic medium.

Torque sensing chamber 14 is supplied via a pump 18 with hydraulic medium that is drawn out of tank 15 through a hydraulic line 20 and is pressurized in pump 18. The output of pump 18 is connected to torque sensing chamber 14 through hydraulic lines 21, 22. Furthermore, the output of pump 18 is connected to tank 15 through hydraulic line 21 and other hydraulic lines 23, 24, 25. At the connection between hydraulic lines 24 and 25 a dot indicates an additional pressure chamber 26, in which practically the same pressure prevails as in tank 15, preferably ambient pressure.

A branching 27 between two hydraulic resistance elements 28, 29 is situated in hydraulic line 24. An interconnecting line 34 extends from branching 27 to two pressing chambers 31, 32, each of which is assigned to an axially movable conical disk 4, 6.

A basic idea of the present invention consists in using torque sensor 10 with a constant, transmission-ratio-independent rise in order to produce a pressure proportional to the torque. In addition, a flow volume with a deliberately lower pressure, in particular the tank pressure, is established through pressing chambers 31, 32 between torque sensing chamber 14 and additional pressure chamber 26, with the aid of resistance elements 28, 29.

A double arrow 35 indicates the movement of axially movable conical disk 6. According to an essential aspect of the invention, resistance element 28 is controlled by the motion or translation 35, as indicated by a control line 36, so that the total pressure drop between torque sensing chamber 14 and additional pressure chamber 26 is divided into desired proportions in order to produce the appropriate pressure in pressing chambers 31, 32.

In conjunction with the present invention it has been found to be especially advantageous if the torque sensor pressure and the pressure in the additional pressure chamber 26 correspond to the maximum and minimum setpoints of the clamping pressure. The result is that the clamping pressure is less sensitive to tolerances of the resistance elements 28, 29.

Figure 1:
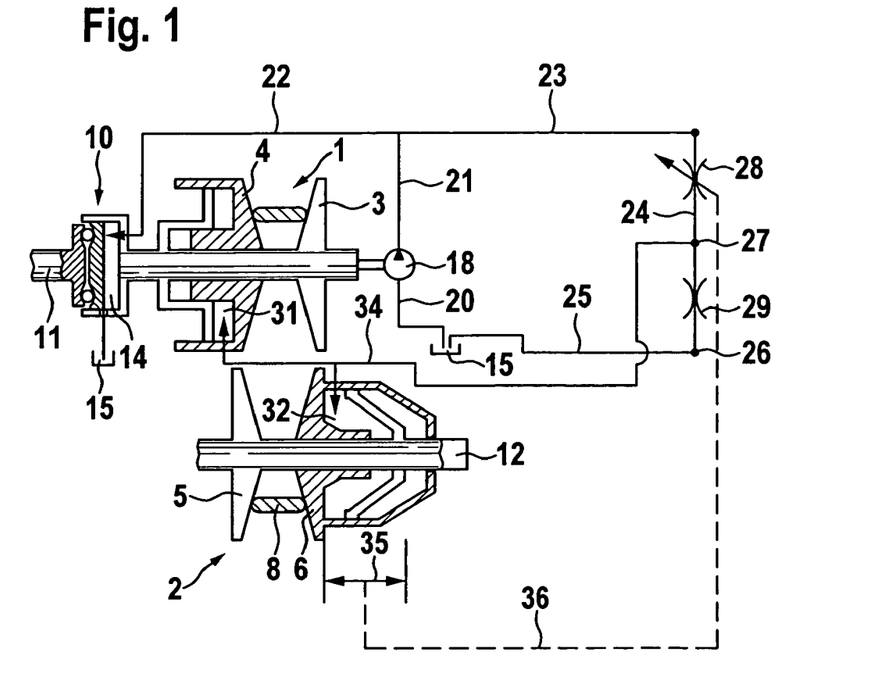
FIG. 1: a schematic depiction of a belt-driven conical-pulley transmission having one fixed and one variable resistance element.
Figure 2:
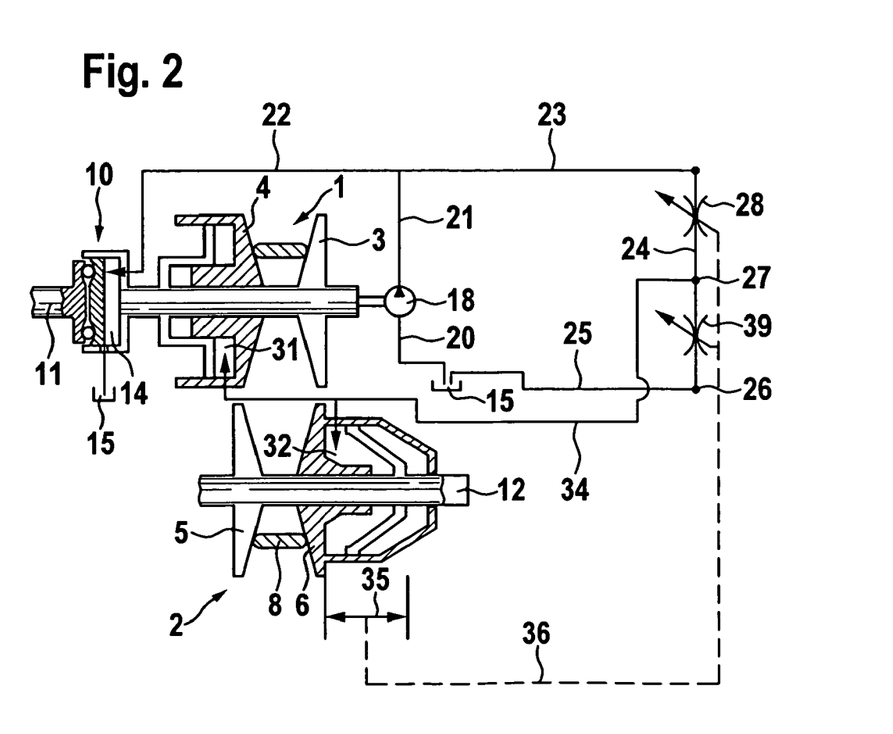
FIG. 2: a belt-driven conical-pulley transmission similar to that in FIG. 1, having two movable or variable resistance elements.

The exemplary embodiment depicted in FIG. 2 shows that instead of the fixed resistance element 29 depicted in FIG. 1 it is also possible to use a variable resistance element 39, which is also controlled via control line 36 by the transmission ratio 35. The hydraulic resistance elements 28, 29, 39 can be executed as throttles, orifices or control edges of a directional valve. The essential thing is that at least one of the resistance elements be controlled by the transmission ratio.

Figure 3:
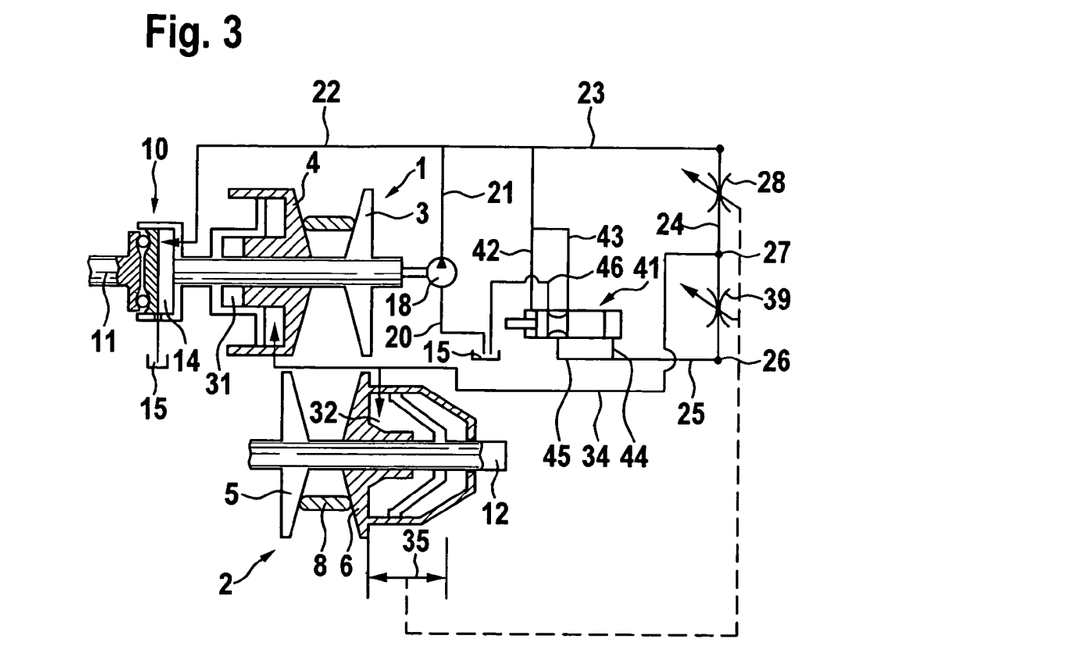
FIG. 3: a belt-driven conical-pulley transmission similar to that in FIG. 2, having an additional pressure reducing valve.

In FIG. 3 the deliberately lower pressure is produced in additional pressure chamber 26 with the aid of the additional pressure reducing valve 41 by a corresponding pressure translation in proportion to the moment sensor pressure. Pressure reducing valve 41 is situated in hydraulic line 25 between tank 15 and additional pressure chamber 26. Via hydraulic lines 42, 43 pressure reducing valve 41 is pressurized with the moment sensor pressure at two connection points through hydraulic lines 22, 23. Pressure reducing valve 41 is connected to hydraulic line 25 through other hydraulic lines 44, 45 and thus is pressurized with the pressure of additional pressure chamber 26. The pressure translation of pressure reducing valve 41 produces a pressure in additional pressure chamber 26 that is proportional to the moment sensor pressure in torque sensing chamber 14. Pressure reducing valve 41 is connected to tank 15 through a hydraulic line 46.

Figure 4:
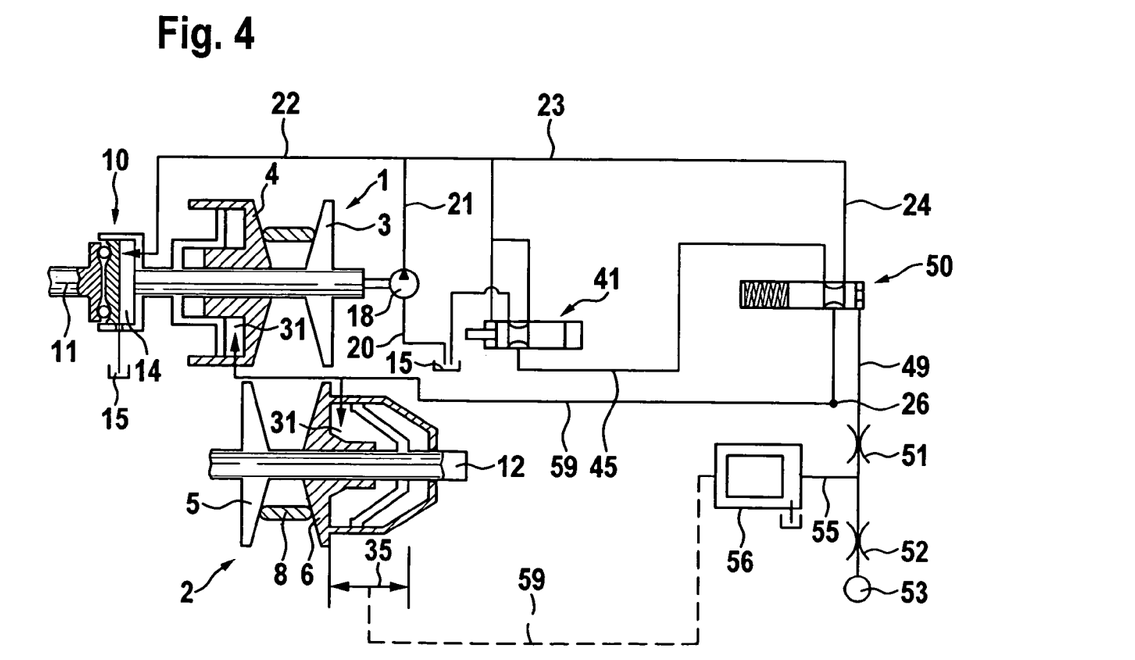
FIG. 4: a belt-driven conical-pulley transmission similar to that in FIG. 3, having one directional valve and one proportional valve.

FIG. 4 shows that the variable resistance elements (28, 39 in FIGS. 2 and 3) can also be realized by the control edge of a directional valve 50. Connected to directional valve 50 is hydraulic line 24, through which directional valve 50 is pressurized with the moment sensor pressure that prevails in torque sensing chamber 14. Also connected to directional valve 50 is hydraulic line 45, by way of which directional valve 50 is connected to tank 15 with pressure reducing valve 41 interposed.

Directional valve 50 includes a valve piston, one of whose ends is under spring pressure. The other end of the valve piston is pressurizable through a hydraulic line 49 with the pressure of a pressure supply source 53. Two hydraulic resistance elements 51, 52, preferably orifices, are situated in hydraulic line 49, between which a proportional valve 56 is connected with the aid of another hydraulic line 55. Proportional valve 56 is actuated electrically via a control line 59 depending on the transmission ratio 35

Figure 5:
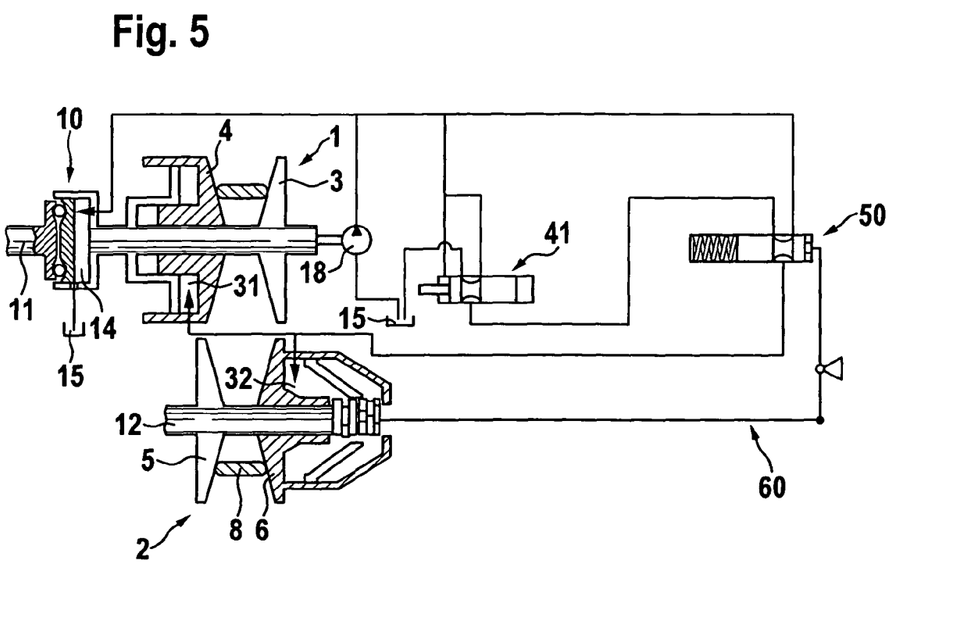
FIG. 5: a belt-driven conical-pulley transmission similar to that in FIG. 4, having a directional valve that is actuated depending on the transmission ratio by way of a lever device.

FIG. 5 indicates that directional valve 50 can also be actuated mechanically through a lever device 60 by the axial motion of axially movable conical disk 6. Lever device 60 may be used to realize a translation of the disk travel and the valve travel of directional valve 50 in a simple manner. This can be implemented by means of the lever of lever device 60 and the difference in elasticity.

Figure 6:
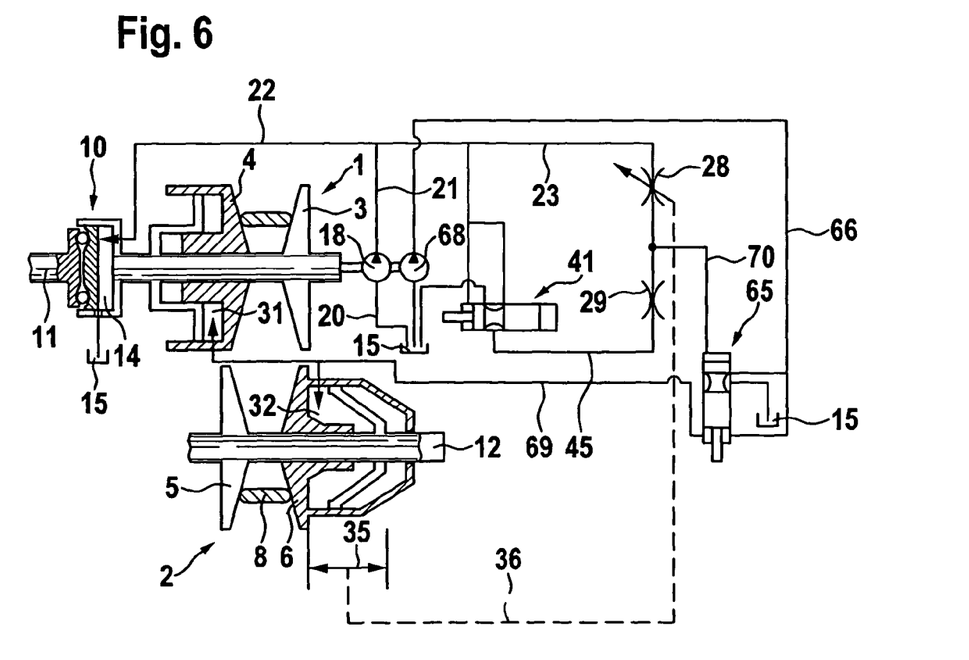
FIG. 6: a belt-driven conical-pulley transmission similar to that in FIGS. 1 and 4, having a pressure limiting valve and an additional pump.

FIG. 6 shows on the basis of another exemplary embodiment how the moment sensor pressure can be reduced by inserting a pressure limiting valve 65 between pressing chambers 31, 32 and the two resistance elements 28, 29. Pressure limiting valve 65 is connected through a line to tank 15. Through another line 66 pressure limiting valve 65 is connected at two connection points to the output of another pump 68, which draws hydraulic medium from tank 15. Pressure limiting valve 65 is connected to pressing chambers 31, 32 at another connecting point through another interconnecting line 69.

Pressure limiting valve 65 includes a valve piston, which is pressurized at one end via a line 70 with the pressure that prevails between the two hydraulic resistance elements 28, 29. By means of a suitable area translation at the valve piston and the additional pump 68, pressure limiting valve 65 provides the desired clamping pressure in pressing chambers 31, 32. One of the advantages supplied by the exemplary embodiment depicted in FIG. 6 is that the system pressure can be reduced for controlling and leakage.

Figure 7:
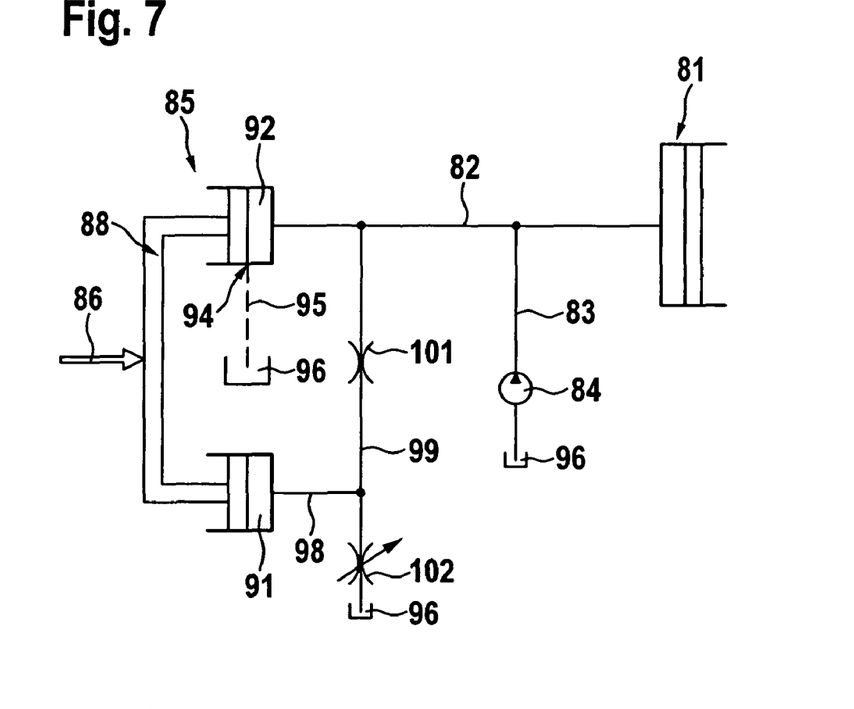
FIG. 7: a greatly simplified depiction of a belt-driven conical-pulley transmission having a variable moment sensor with a fixed orifice and a variable orifice.
Figure 8:
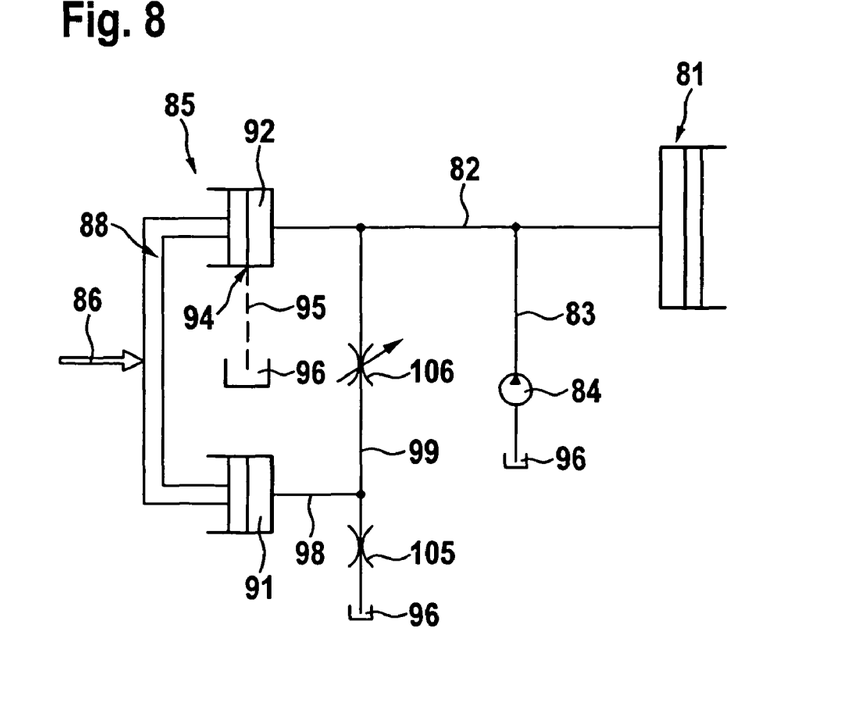
FIG. 8: a belt-driven conical-pulley transmission similar to that in FIG. 7, having a reversed arrangement of fixed orifice and variable orifice.

FIGS. 7 and 8 depict hydraulic systems of belt-driven conical-pulley transmissions that make possible a clamping system that is variable with regard to its dependence on the transmission ratio, at a cost which approaches that of a known two-stage hydraulic system. Starting from a two-stage moment sensor, selective incorporation of a constant orifice and a variable orifice brings about an adaptation of the clamping to a variable moment sensor.

The belt-driven conical-pulley transmissions depicted in simplified form in FIGS. 7 and 8 include a conical pulley on the input side and one on the output side that is rotationally fixed on an output shaft. Each pulley includes one axially movable conical disk and one axially fixed conical disk. The pressing chambers of the axially movable conical disks are indicated in FIGS. 7 and 8 in simplified form by a torque sensing piston 88. Pressing chambers 81 are connected to the output of a pump 84 through a hydraulic line 82 and another hydraulic line 83. Pump 84 draws hydraulic medium from a tank 96.

Pressing chambers 81 are connected to a torque sensor 85 through hydraulic line 82. An axial force exerted by the torque being transmitted, which acts on a moment sensing piston 88 of torque sensor 85, is indicated by an arrow 86. Moment sensor piston 88 is pressurized with a different pressure in a moment sensing chamber 91 than in another moment sensing chamber 92. Moment sensing chamber 92 is connected via hydraulic line 82 to pressing chambers 81 and via hydraulic line 83 to the output of pump 84. Via a control edge 94 that is only hinted at, hydraulic medium can escape from moment sensing chamber 92 through a hydraulic line 95 into tank 96.

Moment sensing chamber 91 is connected via a connecting line 98 to an interconnecting line 99, which extends from hydraulic line 82 into tank 96. Two hydraulic resistance elements 101, 102 are provided in interconnecting line 99, between which connecting line 98 feeds into interconnecting line 99. Hydraulic resistance element 101 is a fixed orifice, which is situated between the convergence of connecting line 98 into interconnecting line 99 and the convergence of interconnecting line 99 into hydraulic line 82. Hydraulic resistance element 102 is a variable orifice, which is situated between the point of convergence of connecting line 98 into interconnecting line 99 and the tank 96.

The basic idea of the hydraulic systems depicted in FIGS. 7 and 8 is based on the twin piston principle. Here pump 84 supplies the flow volume, which flows away via control edge 94 of torque sensing chamber 92. Torque sensor piston 88, which is also referred to as a moment sensor piston, then takes an axial position in which the pressure drop via control edge 94 is so great that equilibrium occurs between the mechanical force that is produced by the torque, or is proportional to the torque, and the hydraulic force. The pressure in torque sensing chamber 92 is transmitted via hydraulic line 82 into the pressing chambers 81 or onto clamping surfaces, and thus determines the clamping force on the endless torque-transmitting means, in particular the chain of the belt-driven conical-pulley transmission.

But forming the pressure in torque sensing chamber 92 also results at the same time in a flow volume through fixed diaphragm 101 to torque sensing chamber 91, which is also referred to as the second moment sensing chamber. A pressure can be produced in torque sensing chamber 91 by carefully adjusting the size of variable orifice 102. Because of the equilibrium of mechanical and hydraulic forces, this pressure in torque sensing chamber 91 brings about a lowering of the pressure in torque sensing chamber 92, which is also referred to as the first torque sensing chamber. The drop in pressure in torque sensing chamber 92 in turn brings about a lowering of the pressure in pressing chambers 81, and thus a reduction of the pressing on the pulley.

In the exemplary embodiment depicted in FIG. 7, the lowest proportionality constant is set by way of the pressure in torque sensing chamber 92. In that case variable orifice 102 is fully open. The pressure in torque sensing chamber 92, i.e., the clamping pressure, is determined from the quotient of the axial force 86 on moment sensor piston 88 and the area of moment sensor piston 88, which delimits torque sensing chamber 92. A flow volume then flows through fixed orifice 101 in the direction of tank 96. The pressure drop at variable orifice 102 is zero, and the counterforce to the moment sensor piston force in torque sensing chamber 92 through second torque sensing chamber 91 is likewise zero.

To produce a change in the proportionality constant depending on the transmission ratio, when an adjustment is made in the transmission ratio the size of variable orifice 102 is changed. Since the position of the movable disk can be converted to a transmission ratio nearly independently of the load, the movable disk position is simply used for the change to the variable orifice 102. A smaller diameter of variable orifice 102 causes a pressure drop there, and the pressure in torque sensing chamber 91 then acts in combination with the area of torque sensing chamber 91 as an additional opposing force to the piston force. The pulley pressure operating in pressing chamber 81, which prevails in torque sensing chamber 92, can then drop by a corresponding measure. All-in-all, a corresponding proportionality constant results, depending on the size set for variable orifice 102. The area of torque sensing chamber 91 is designed so that with variable orifice 102 closed the largest proportionality constant setting results.

The proportionality constant that results from the quotient of the torque divided by the pressure in torque sensing chamber 92 is changed only by the passageway cross section of variable orifice 102. According to another aspect of the invention, the size of this cross section is made dependent on the movable disk position—that is, the position of the axially movable conical disk—, in order to obtain a proportionality constant that is dependent on the transmission ratio.

FIG. 8 indicates that the arrangement of the orifices can also be reversed. In the exemplary embodiment depicted in FIG. 8, a fixed orifice 105 is inserted between tank 96 and connecting line 98. A variable orifice 106 is inserted between connecting line 98 and hydraulic line 82. In this exemplary embodiment, variable orifice 106 is closed for the smallest proportionality constant and completely open for the largest constant.

Figure 9:
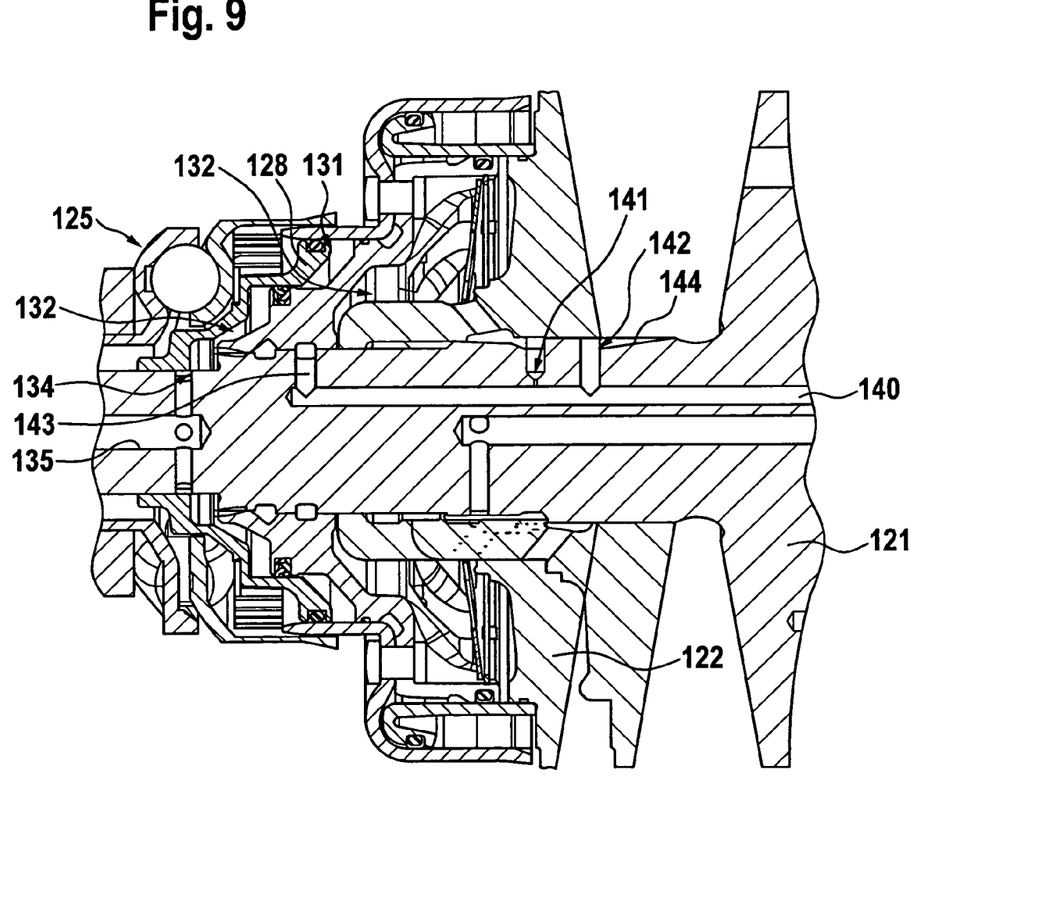
FIG. 9: a detail of a belt-driven conical-pulley transmission in longitudinal sectional view, having a variable orifice executed as a chamfer in a fixed disk.

FIG. 9 shows a longitudinal sectional view of an axially fixed conical disk 121, which operates together with an axially movable conical disk 122 and forms a conical pulley. Axially fixed conical disk 121 is formed in a single piece with a shaft on which axially movable conical disk 122 is carried. Situated on the side of axially movable conical disk 122 facing away from axially fixed conical disk 121 is a torque sensor 125 with a torque sensor piston 128. Torque sensor piston 128 delimits a moment sensing chamber 131 and another moment sensing chamber 132. Moment sensing chamber 132 is relievable into a pressure relief space (not shown) via a control edge 134 that is provided on the shaft of axially fixed conical disk 121, as well as via a cross-drilled hole and a longitudinally drilled hole 135 that is connected to it. Control edge 134 operates together with torque sensor piston 128.

Torque sensing chamber 132 is connected via a fixed orifice 141 to a longitudinally drilled hole 140, which in turn is connected via a cross-drilled hole 143 to torque sensing chamber 131. Longitudinal hole 140 and hence torque sensing chamber 131 are connected through a variable orifice 142 to a pressure relief space, for example an oil sump. Variable orifice 142 includes, viewed in longitudinal section, a chamfer 144 which operates together with axially movable conical disk 122 to release different orifice cross sections, depending on the axial position of axially movable conical disk 122. The special shaping of chamfer 144 in axially fixed conical disk 121, or in the shaft which is connected to it in a single piece, makes it possible to set the desired orifice cross section depending on the movable disk.

Figure 10:
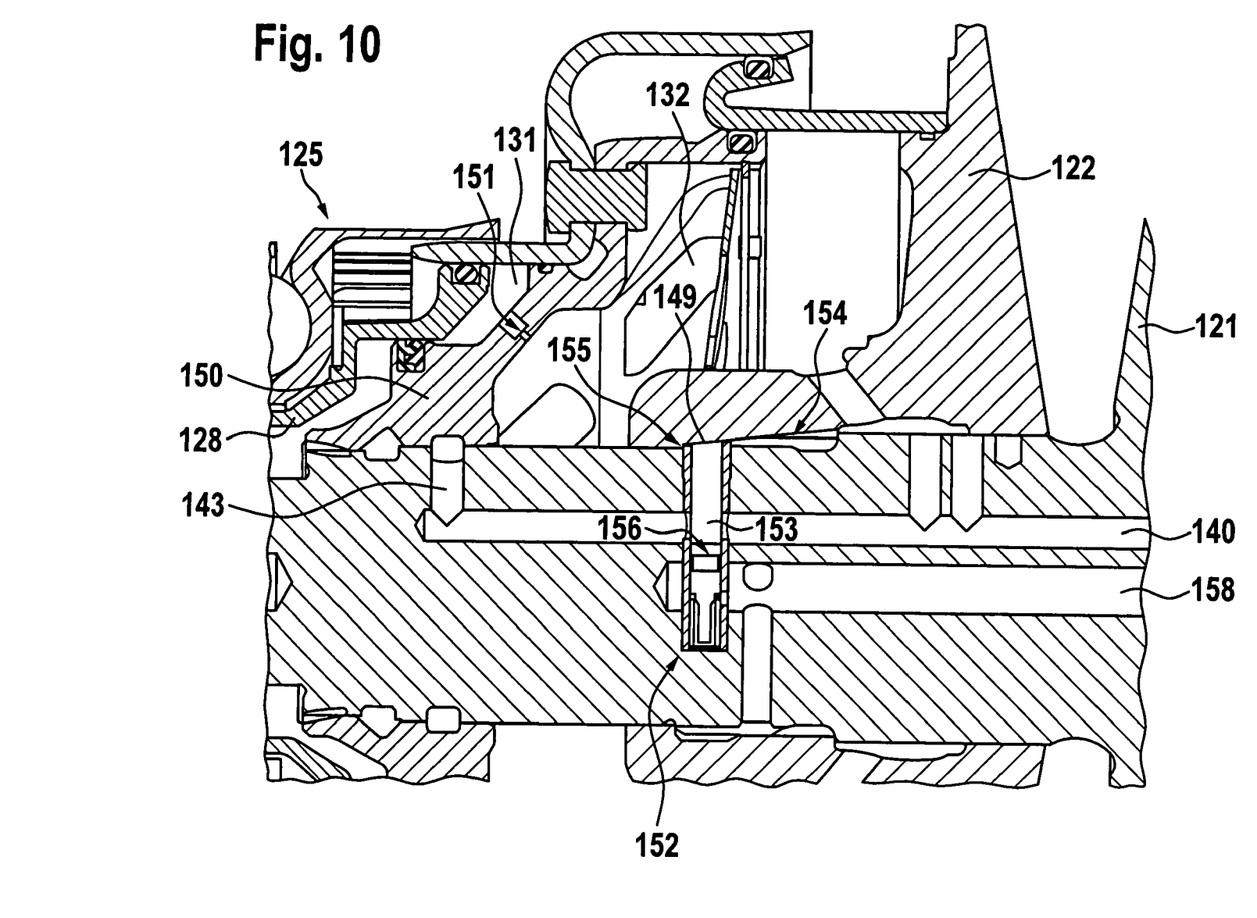
FIG. 10: a detail similar to that in FIG. 9, with a chamfer to translate the motion of the movable disk.

FIG. 10 depicts a similar exemplary embodiment to that in FIG. 9, in longitudinal sectional view. The same reference labels are used to designate like parts. To avoid repetitions, we refer to the earlier description of FIG. 9. The next section will examine primarily the differences between the two exemplary embodiments.

In the exemplary embodiment depicted in FIG. 10, a fixed orifice 151 in the form of a through hole that extends through a flange-type component 150 is provided between torque sensing chamber 131 and torque sensing chamber 132. Flange-type component 150 is attached to axially fixed conical disk 121, or to the shaft which is connected to the latter in a single piece. Longitudinally drilled hole 140 is connected to a pressure relief space through a variable orifice 152. The pressure relief space is indicated by another longitudinally drilled hole 158, which extends parallel to longitudinally drilled hole 140.

Variable orifice 152 includes a piston 153, which has a chamfer 149 on one end that acts together with another chamfer 154 that is provided radially on the inside of axially movable conical disk 122. The chamfers 149, 154 bearing against each other ensure that a movable disk motion of axially movable conical disk 122, which is also referred to as a movable disk, is translated into a radial motion of piston 153. Piston 153 is guided so that it can move back and forth in a sleeve 155, which has through holes in the area of the longitudinally drilled holes 140 and 158. Also provided on piston 153 is a control chamfer 156, which is situated perpendicular to the plane of the section. Control chamfer 156 in combination with the through holes in sleeve 155 forms the requisite orifice cross section.

What is claimed is:

1. A hydraulic system for actuating a continuously variable belt-driven conical-pulley transmission having two conical pulleys encircled by an endless torque-transmitting means, each of which includes two conical disks, one of which is axially movable as a function of the pressure in an associated pressing chamber, and having a torque sensor which includes a torque sensing chamber that is connected to a hydraulic energy source and is in fluid communication with the pressing chambers, said hydraulic system comprising: a first hydraulic resistance element positioned between and communicating with each of respective first pressing chambers associated with respective ones of the axially movable conical disks and the torque sensing chamber, and a second hydraulic resistance element in a conduit connecting each of the first pressing chambers to a second pressure chamber in which second chamber a lower pressure prevails than pressures in the first pressing chambers and in the torque sensing chamber.

2. The hydraulic system according to claim 1, wherein at least one of the hydraulic resistance elements is of adjustable and is controlled by the transmission ratio of the belt-driven conical-pulley transmission.

3. The hydraulic system according to claim 2, wherein the first hydraulic resistance element is an adjustable hydraulic resistance element.

4. The hydraulic system according to claim 3, wherein a pressure limiting valve is connected between the connection that joins the two first pressing chambers with each other and with the first and second hydraulic resistance elements.

5. The hydraulic system according to claim 4, wherein the pressure limiting valve includes a movable valve piston for providing a desired clamping pressure in the first pressing chambers and is connected to an additional hydraulic energy source.

6. The hydraulic system according to claim 3, wherein the connection that joins the tow first pressing chambers with each other is positioned between the first and second resistance elements.

7. The hydraulic system according to claim 6, wherein the second hydraulic resistance element is a fixed hydraulic resistance element.

8. The hydraulic system according to claim 6, wherein the second hydraulic resistance element is an adjustable hydraulic resistance element.

9. The hydraulic system according to claim 3, wherein a third pressure reducing valve is connected between the second pressure chamber and a tank.

10. The hydraulic system according to claim 3, wherein the pressure in the torque sensing chamber corresponds to a maximum setpoint of the pressure in the first pressing chambers.

11. The hydraulic system according to claim 3, wherein the pressure in the second pressure chamber corresponds to a minimum setpoint of the pressure in the first pressing chambers.

12. The hydraulic system according to claim 3, wherein the adjustable hydraulic resistance element includes at least one control edge of a directional valve.

13. The hydraulic system according to claim 12, wherein the directional valve is actuated via a control pressure line by a proportional valve.

14. The hydraulic system according to claim 13, wherein the proportional valve is actuated as a function of the transmission ratio.

15. The hydraulic system according to claim 12, wherein the directional valve is actuated by a mechanical translation system as a function of the transmission ratio.

16. The hydraulic system according to claim 1, wherein at least one of the hydraulic resistance elements is connected between the torque sensing chamber and the second pressure chamber.

17. The hydraulic system according to claim 16, wherein at least one of the hydraulic resistance elements is connected between the torque sensing chamber and to one of a second torque sensing chamber or and the fire pressing chambers.

18. The hydraulic system according to claim 16, wherein at least one of the hydraulic resistance elements includes a fixed orifice that is provided in a shaft that carries one of the axially fixed conical disks.

19. The hydraulic system according to claim 16, wherein at least one of the hydraulic resistance elements includes a variable orifice that is provided in a shaft that carries one of the axially fixed conical disks.

20. The hydraulic system according to claim 19, wherein at least one of the variable orifice includes a chamfer having a longitudinal section with a gradient such that the cross section of the variable orifice vanes as a function of the axial displacement of the associated axially fixed conical disk.

21. The hydraulic system according to claim 16, wherein at least one of the hydraulic resistance elements includes a variable orifice with a piston that is movable back and forth in a radial direction relative to the longitudinal axis of a shaft that carries an associated axially fixed conical disk.

22. The hydraulic system according to claim 21, wherein one end of the piston has a chamfer which operates together with a chamfer on an associated axially movable conical disk to control flow of hydraulic fluid.

23. The hydraulic system according to claim 21, wherein the piston includes a control chamfer which has a gradient such that the cross section of the variable orifice varies as a function of the axial displacement of the associated axially movable conical disk.

24. The hydraulic system according to claim 1, wherein the hydraulic resistance elements are provided in the form of throttles, orifices, or control edges.

25. The hydraulic system according to claim 1, wherein the second pressure chamber is connected to a tank.

26. The hydraulic system according to claim 1, wherein the torque sensor includes a ramp arrangement that operates to produce a pressure in the torque sensing chamber that is proportional to the torque.

27. The hydraulic system according to claim 26, that wherein the ramp arrangement includes ramps with a transmission-ratio-independent constant gradient in order to produce a pressure proportional to the torque.

\* \* \* \* \*